United States Patent [19]

Hicks

[11] Patent Number: 4,756,817
[45] Date of Patent: Jul. 12, 1988

[54] APPARATUS FOR PRESSING PLATE-TYPE STRUCTURES

[75] Inventor: Roy L. Hicks, Lake Jackson, Tex.

[73] Assignee: The Dow Chemical Company, Midland, Mich.

[21] Appl. No.: 901,924

[22] Filed: Aug. 29, 1986

[51] Int. Cl.[4] .......................... C25B 9/00; C25C 7/00; B01D 25/12

[52] U.S. Cl. ................................. 204/253; 204/267; 204/279; 210/230; 210/231

[58] Field of Search ............................... 204/253–258, 204/267–270, 279, 224–225; 210/227, 228, 231

[56] References Cited

U.S. PATENT DOCUMENTS

| | | | |
|---|---|---|---|
| 1,273,357 | 7/1918 | Gougnard | 204/256 |
| 3,807,567 | 4/1974 | Iwatani | 210/231 X |
| 4,343,710 | 8/1982 | Shackleton et al. | 210/225 X |
| 4,541,911 | 9/1985 | Burgess et al. | 204/253 |
| 4,597,862 | 7/1986 | Davis | 210/106 |
| 4,600,509 | 7/1986 | Sato | 210/230 |
| 4,623,453 | 11/1986 | Davenport | 210/225 X |
| 4,664,797 | 5/1987 | Kurita | 210/225 |
| 4,668,385 | 5/1987 | Hamazaki | 210/91 |

OTHER PUBLICATIONS

EIMCO Process Equipment Company sales brochure, 1982, p. 5.
Netzsch Incorporated sales brochure, p. 7.
Rittershaus & Blecher sales brochure, pp. 12–15.
Hoesch sales brochure, Apr., 1985, p. 3

Primary Examiner—Donald R. Valentine

[57] ABSTRACT

An apparatus for compressing and shifting flat plate-type structures including first and a second support members for supporting side rails attached generally perpendicular to the support members in a generally parallel and spaced apart position adapted for supporting any number of flat plate-type structures slidably mounted thereon, and a mobile platen for pressing the frame structures together, the improvement being an elongated slider member slidably mounted on the top portion of the side rails for slidably shifting the flat plate-type structures along the top and along the axis of side rails after clamping a plurality of cell structures, for example, to one stationary support member and clamping another plurality of flat plate-type structures together, thereby selectively shifting the desired flat plate-type structures a desired distance apart to remove or replace a flat plate-type structure or its internal parts disposed between the flat plate-type structures.

The apparatus may be used, for example, in the chlor-alkali industry for compressing and shifting plate-type cell frame members.

9 Claims, 8 Drawing Sheets

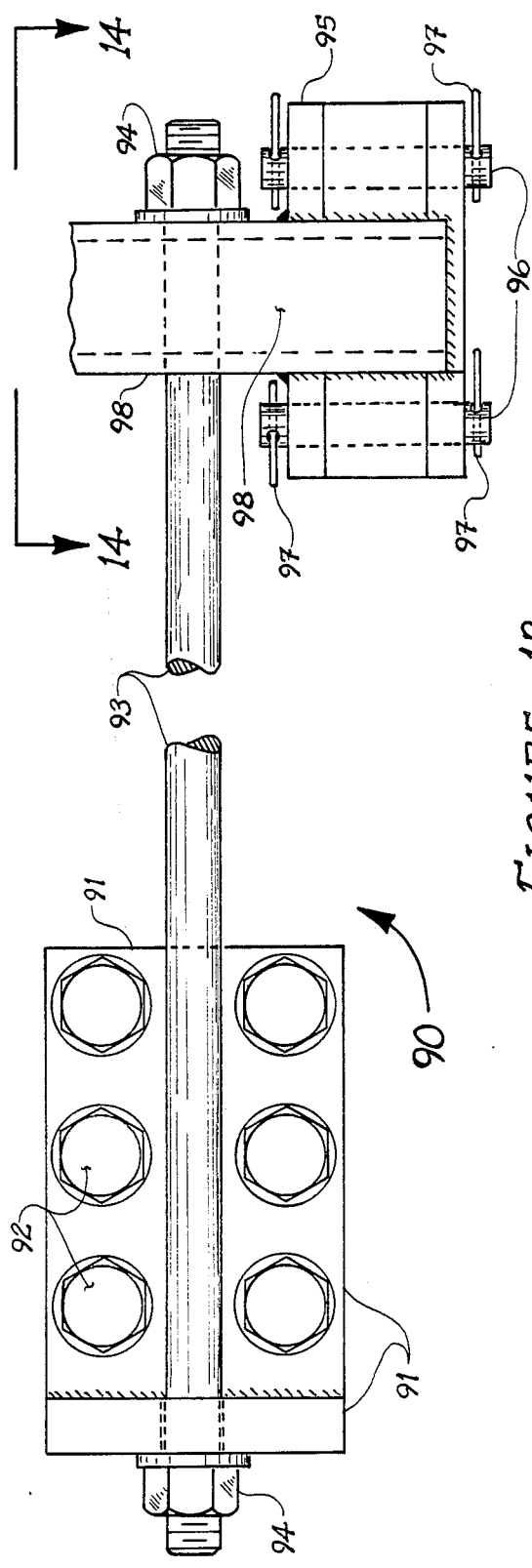
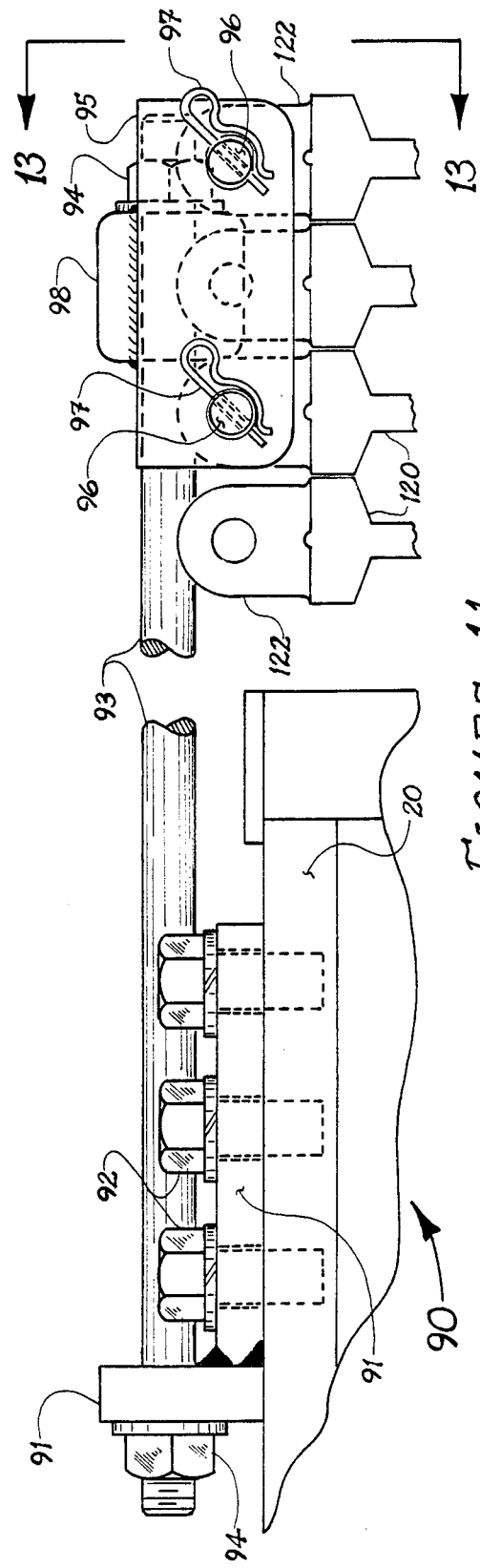
FIGURE 12
FIGURE 11

APPARATUS FOR PRESSING PLATE-TYPE STRUCTURES

BACKGROUND OF THE INVENTION

This invention relates to an apparatus for pressing a single of plurality of plate-type structures in combination with a means for shifting a single or plurality of plate-type structures.

There are a variety of apparatuses used for pressing plate-type structures as well as a variety of plate-type structures in different industries. For example, in the chlor-alkali industry, an apparatus referred to herein as a "squeezer apparatus" is used for compressing together a single or plurality of flat plate-type electrode frame members of the monopolar or bipolar type to form an electrolysis cell or electrolyzer for producing chlorine and an alkali metal hydroxide such as sodium hydroxide.

In the filtration industry, a plate-type pressure apparatus is used to compress together a plurality of filter press-type frame structures for use in separating solids from a slurry or mixtures of solids and liquid by means of a permeable filter media.

In the molding industry, plate-type structures are compressed or squeezed together to form a series of plate-type chambers such that a moldable fluid can be injected into the chambers to form molded products.

In any of the above processes, routinely, when maintenance is required on a particular faulty plate-type structure, each structure must be pulled apart and shifted manually or mechanically in order to reach the faulty structure. Shifting each structure requires considerable shutdown time especially when the number of structures per squeezer apparatus is increased. In addition, when each structure has to be shifted individually, the structures not requiring maintenance and their internal parts such as gaskets, may be damaged or disturbed to the extent that, when the plate-type structures are re-compressed, an original alignment is not reproducible resulting in leakage between structures and eventual operation shutdown.

Until now, there has been no satisfactory means of pulling apart or shifting multiple plate-type structures within an apparatus for pressing the structures once the plate-type structures have been compressed together.

It is therefore desired to provide an apparatus for pressing together plate-type structures in combination with a device for shifting an individual or multiple plate-type structures.

SUMMARY OF THE INVENTION

The present invention is an apparatus for pressing together flat plate-type structures such as chlor-alkali electrolytic cell frames, comprising a first and second support means adapted for supporting a pair of side rails spaced apart generally parallel to each other and attached generally perpendicular to said support means, said side rails adapted for supporting flat plate-type structures slidably mounted thereon, a mobile platen slidably mounted on the side rails and connected to a hydraulic press means adapted for pressing the mobile platen against and toward the flat plate structures such that the flat-plate structures are compressed together, the improvement which comprises:

an elongated slider member slidably mounted on the side rails and releasably attached to the mobile platen such that at least one or more plate-type structures can be shifted along the axis of the side rails when the mobile platen is moved.

The apparatus may include at least one first clamping means for releasably clamping at least one flat plate-type structure to a support means, and optionally, at least one second clamping means for releasably clamping at least one or more flat plate-type structures together.

BRIEF DESCRIPTION OF THE DRAWINGS

FIG. 11 is a side view of a means for clamping the stationary end support of the squeezer apparatus of FIG. 1 to a plurality of electrolytic flat plate-type cell frame structures in the squeezer apparatus.

FIG. 12 is the top view of FIG. 11.

DETAILED DESCRIPTION OF THE PREFERRED EMBODIMENTS

Figure 1:
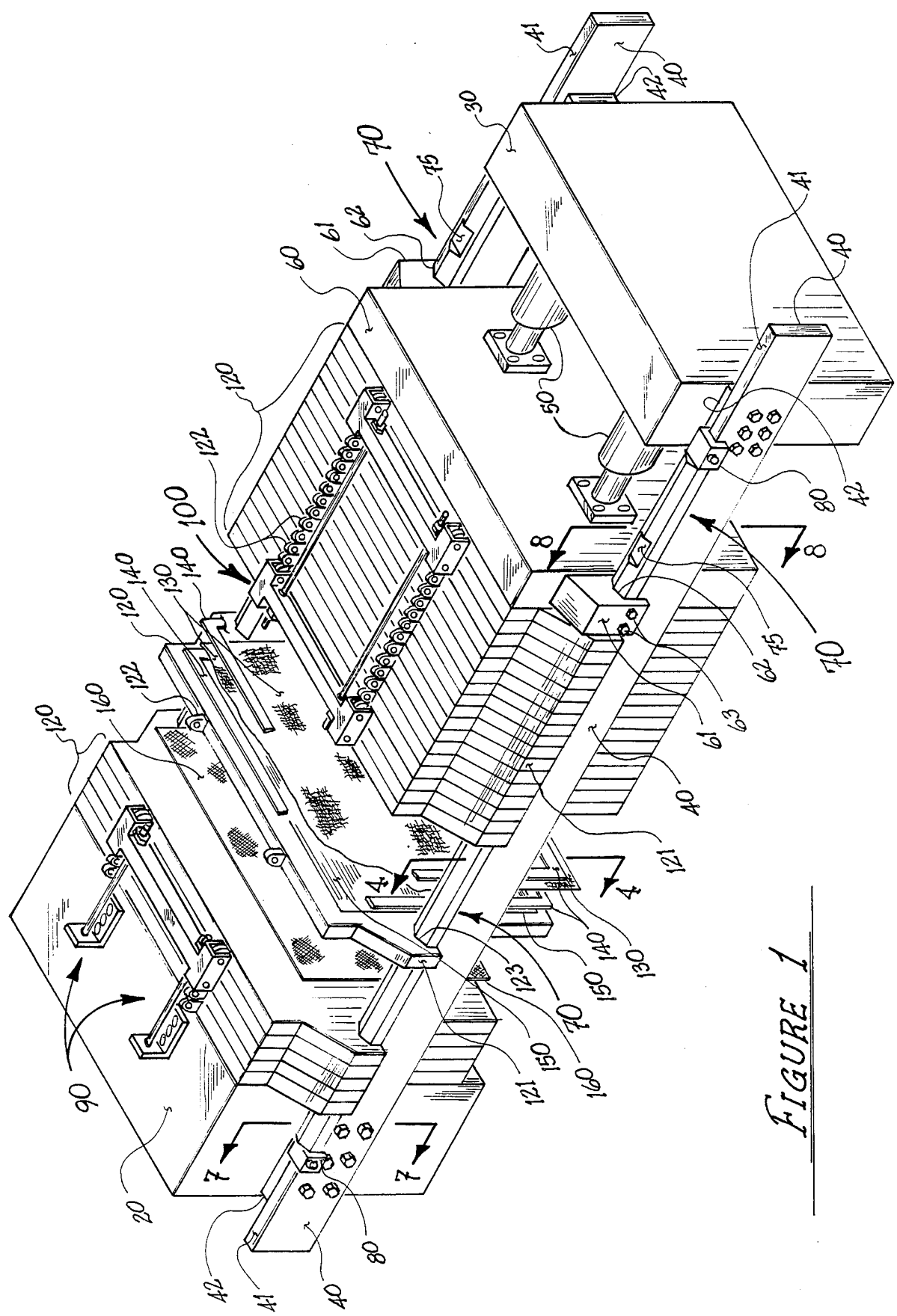
FIG. 1 is a perspective view, partially exploded view, of a squeezer apparatus with electrolytic flat plate-type cell frame structures therein.
Figure 2:
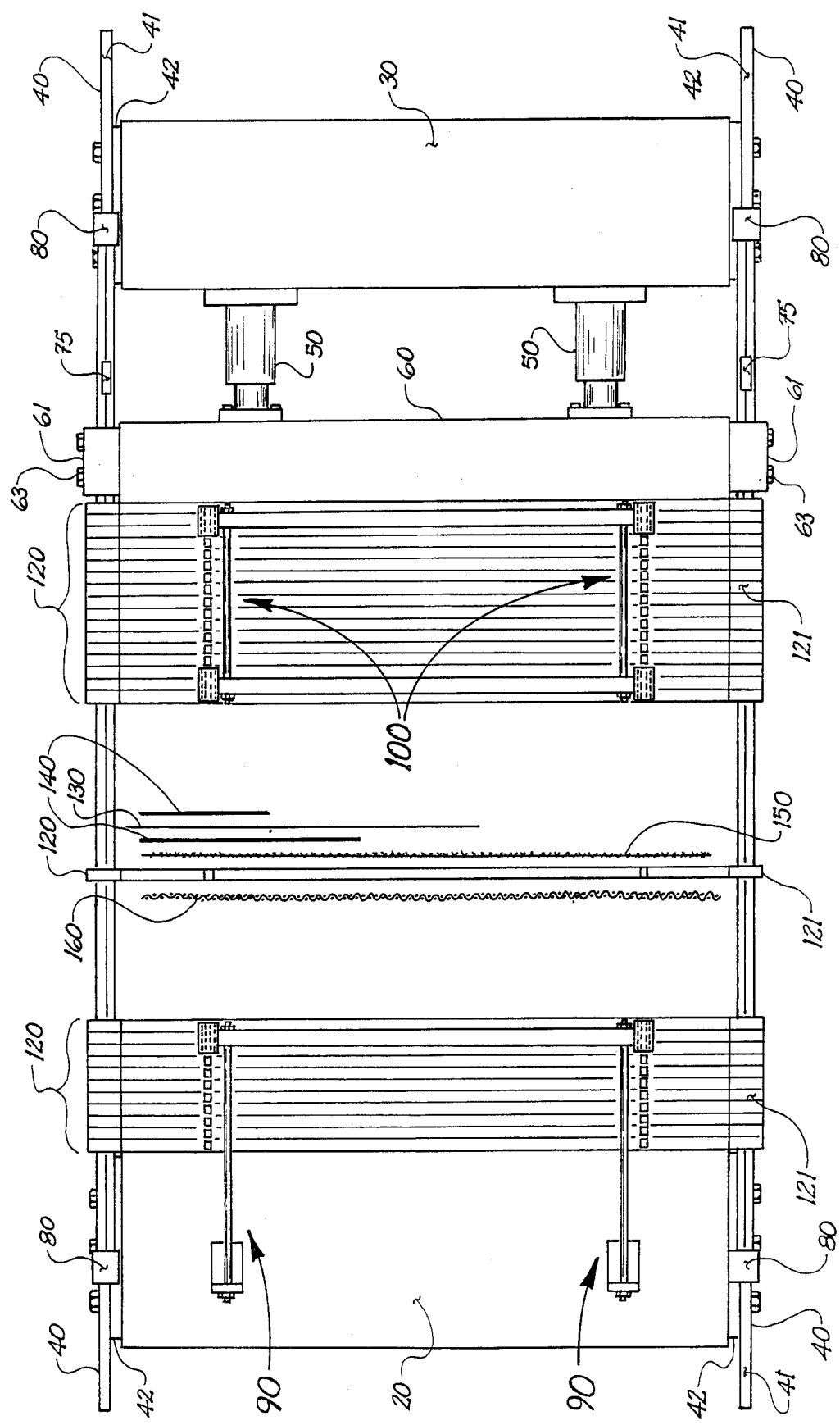
FIG. 2 is a top view, partially exploded view, of a squeezer apparatus with electrolytic flat plate-type cell frame structures therein.
Figure 3:
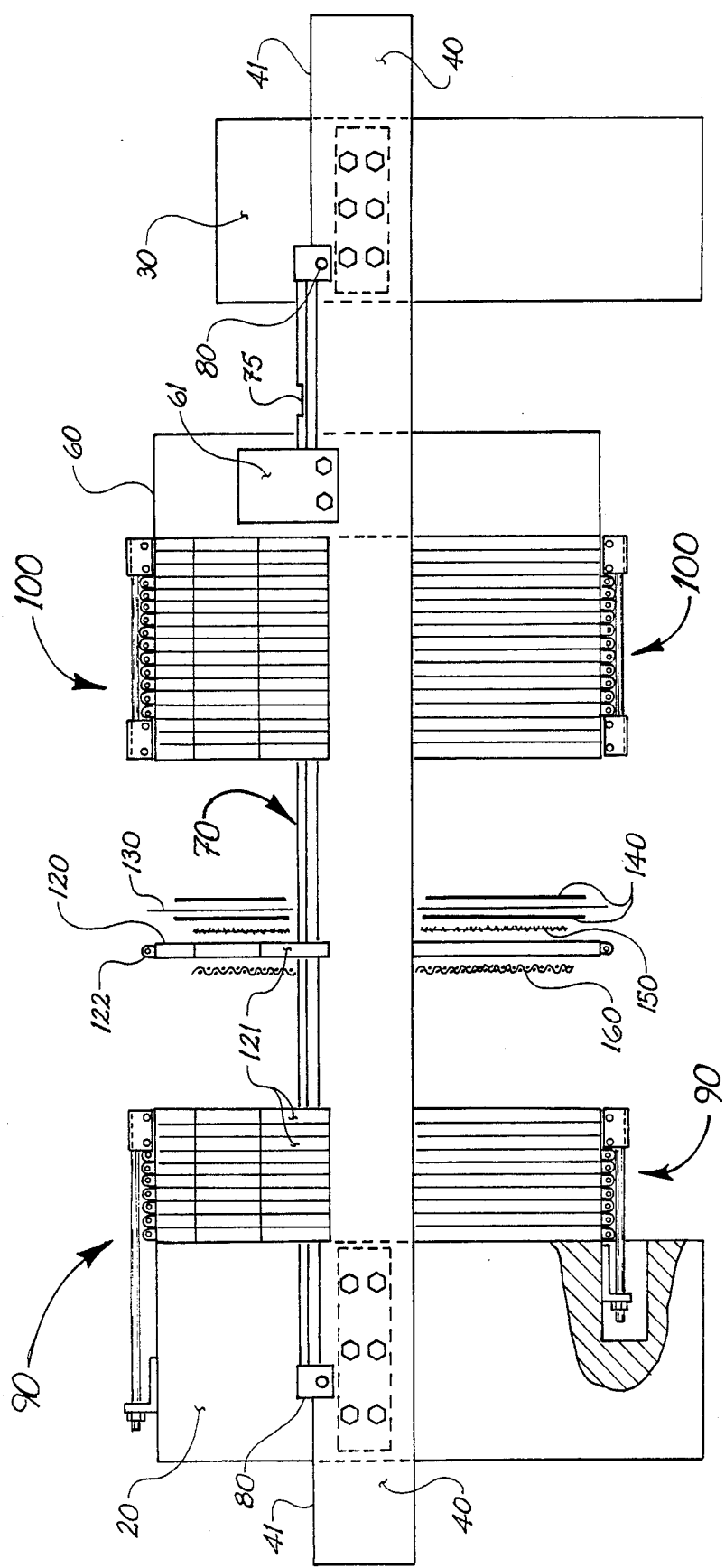
FIG. 3 is a side view, partially exploded view, of a squeezer apparatus with electrolytic flat plate-type cell frame structures therein.
Figure 4:
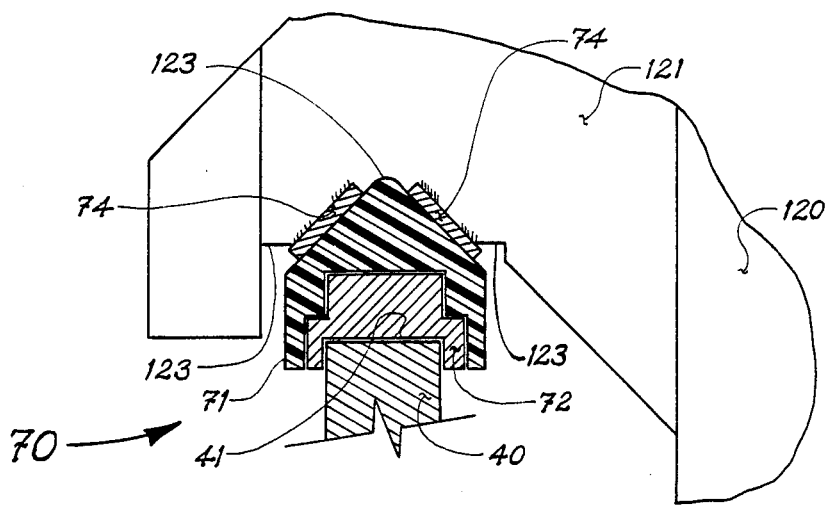
FIG. 4 is a cross-sectional view taken along line 4—4 of FIG. 1.

With reference to FIGS. 1, 2 and 3, there is shown an apparatus of the present invention for compressing or pressing together a plurality of generally planar or flat plate-type structures 120. The pressing apparatus described herein will be referred to as a "squeezer." The squeezer, generally disposed horizontally, includes a pair of support means, 20 and 30, adapted for end supports, for supporting a pair of horizontally aligned side bars or side rails 40. The side rails 40 are generally parallel to each other and spaced apart and fixed generally perpendicular to the support means 20 and 30 at near the ends of the side rails.

The side rails 40 are adapted for supporting a single or plurality of flat plate-type structures 120 which are slidably mounted on the side rails 40 and supported or hung on the side rails by supporting hangers 121. Typically, the flat plate-type structures 120 are placed on the side rails 40 by lifting the structures using a crane means via a cable attached to the lifting lugs 122.

At least one of the support means, in this instance support means 30, is adapted for supporting a means for pressing the flat plate-type structures 120. Support means 30 may be any rigid structure capable of supporting the side rails 40 and the press means. In this instance, the press means includes a hydraulic press unit including hydraulic cylinders 50 which are secured to the support means 30. In FIGS. 1, 2 and 3, support means 30 is shown as a platen. Platen 30 may be stationary, for example, anchored to a foundation or free-floating, for example, fixed only to the side rails 40. Support means 20 is a fixed or stationary platen, for example anchored to a foundation.

A "follower" or mobile platen 60 is slidably mounted on the side rails 40 and secured to the hydraulic cylinders 50. The mobile platen 60 hangs or is supported on side rails 40 by supporting hangers 61.

An elongated slider plate hanger, generally indicated by numeral 70 and more clearly shown in FIGS. 4-8, is slidably mounted on at least a portion of the top portion 41 of each of the side rails 40 and is slidably contacted with the inner surface 62 and 123 of hangers 61 and 121 of the mobile platen 60 and the flat plate-type structures 120, respectively. The slidability of the slider members 70 may be facilitated by interposing a lubrication means between the top portion 41 of the side rails 40 and the bottom of the slider members 70. Lubricants can be injected between the slider members 70 and the side rails 40, for example, by use of a grease fitting (not shown). In another embodiment, the slidability of the slider members 70 can be enhanced by use of, for example, grooves, ball bearing or roller bearing and the like interposed between the slider members 70 and the side rails 40.

The slider members 70 may be any shape or form desired that does not restrict its ability to slide on top of and along the horizontal axis of the side rails 40. The slider members 70 should also be of a shape or form that does not restrict the ability of the plate-type structures 120 with hangers 121 or the mobile platen 60 with hangers 61 from moving on top of the slider members 70 and along the horizontal axis of the side rails 40.

Figure 7:
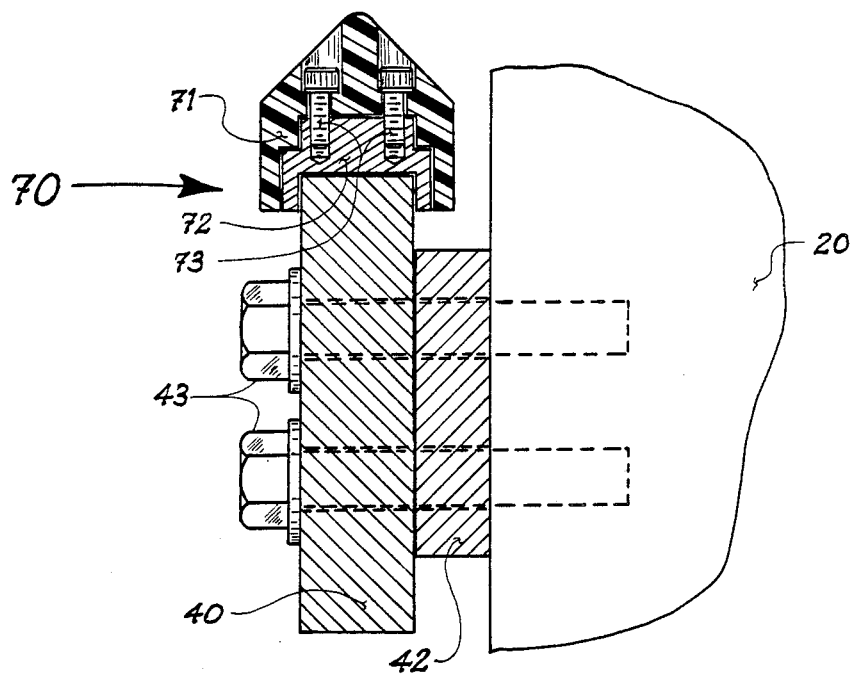
FIG. 7 is a cross-sectional view taken along line 7—7 of FIG. 1.

Preferably, the slider members 70 are in the form of slidable channels or covers which covers at least a portion of the top portion 41 of the side rails 40. The slider members 70 may cover the entire length of the side rails 40 or any portion thereof. In one embodiment, a cross-section of the slider members 70, shown in FIGS. 4, 6, 7 and 8, can be generally triangular in shape. In another embodiment, shown in FIG. 5, the cross-sectional shape of the slider members 70 is generally rectangular in shape. In FIGS. 1 and 7, there is shown a spacer means such as shim plates or flat plates 42 fastened to the stationary platen 20 with removable threaded bolts 43 for providing a gap between the platens 20 and 30 and the side rails 40 to allow a clearance for the slider members 70 to travel on top of the side rails 40.

The slider members 70 may be constructed of one material or a combination of different materials. In addition, the slider members 70 may be a composite of one or more layers of materials attached together, for example, by an adhesive welding or threaded bolts. The materials used in constructing the slider members 70 may be any rigid metal or metal alloy capable of withstanding tensile and compressive loading for example, carbon steel.

Figure 5:
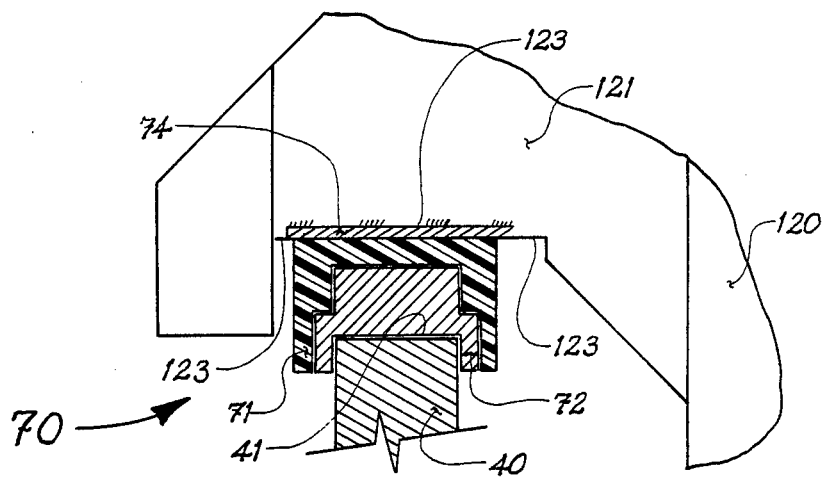
FIG. 5 is a cross-sectional view of another embodiment of the slider member shown in FIG. 4.
Figure 6:
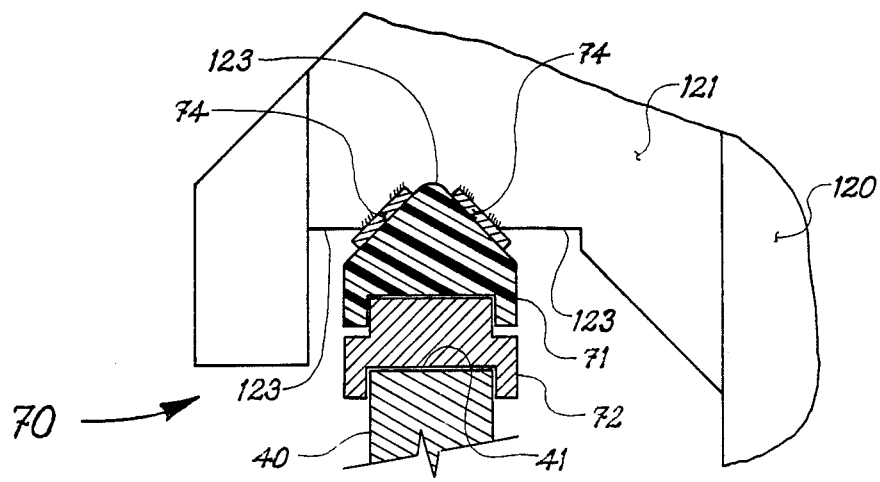
FIG. 6 is a cross-sectional view of another embodiment of the slider member shown in FIG. 4.

In FIGS. 4-8, there are shown preferred embodiments of the slider members 70 used, for example, in electrolytic cell applications. The slider members 70, preferably, comprise insulation members 71 secured to slider base plates 72. The insulation members 71 can be fastened to the base plates 72 by any fastening means desired such as threaded bolts 73 shown in FIGS. 7 and 8. The insulation members 71 are adapted for providing an electrical insulating means and a low friction means for the electrolytic cell flat plate-type structures via the inner surface 123 of the hangers 121. The insulation members 71 must be constructed of an electrically non-conductive material such as a high impact resistant plastic, for example fiberglass reinforced Teflon ®. In FIGS. 4, 6, 7 and 8, insulation members 71 are triangularly shaped and fit into the matching shape on hangers 61 and 121 of the mobile platen 60 and the plate type structures 120, respectively. This shape provides alignment requirements for the structures. FIG. 5 shows the embodiment of slider member 70 when alignment of the structures is not necessary. In addition, the electrolytic cell flat plate-type structures may contain a liner material 74 such as Teflon ® on the inside portions 123 of the hangers 121 which is in contact with the insulation members 71 for providing additional low friction means to the flat plate-type structures.

An actuating means for sliding the slider members 70 axially along the top portion 41 of the side rails 40 is required in the present invention. The slider members 70 may be fastened to an actuating means (not shown) separate and independent from the squeezer for sliding the slider members 70 axially along the top portion 41 of the side rails 40. It is preferable to secure or fasten the slider members 70 to the mobile platen 60 with a fastening means such that when the mobile platen 60 is closed or opened, i.e., pressed against the plate-type structures 120 or retracted from the plate-type structures, respectively, the slider members 70 slidably and axially move along the top portion 41 of the side rails 40 with the movement of the mobile platen 60 along the top portion 41 of the side rails 40.

Figure 8:
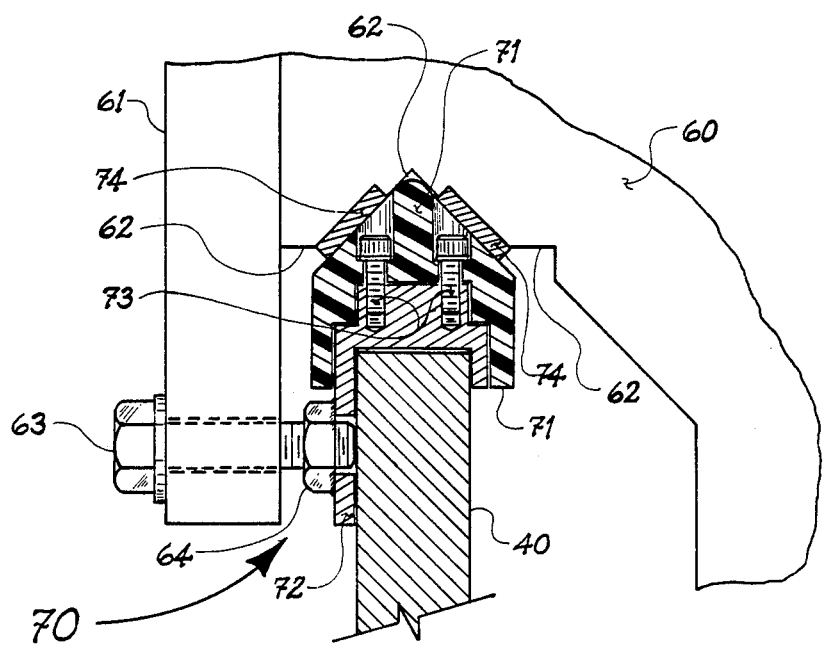
FIG. 8 is a cross-sectional view taken along line 8—8 of FIG. 1.

With reference to FIG. 8 the means for fastening the slider member 70 to the mobile platen 60 may consist of removable threaded bolts 63 and nuts 64. With slider members 70 attached to the mobile platen 60, the movement of the mobile platen 60 slides the slider member 70 along the top portion 41 of the slide rails 40. The length of the movement of the hydraulic cylinders 50 determines the length of movement of the slider members 70. The mobile platen 60 may be disposed to match one or more scribe markings or recesses such as notches 75 (shown in FIGS. 1, 2 and 3) in the slider member 70 by repositioning bolts 63 on the slider member 70. The markings or notches 75 and the adjustable mobile platen 60 provides a means for creating a predetermined gap between two groups of plate-type structures, between a single plate-type structure and a group of plate-type structures or between the mobile platen 60 and a single plate-type structure or group of structures. Optionally, stopper members 80 (shown in FIGS. 1, 2 and 3) may be fastened at each end of the side rails 40 for stopping the movement of the slider members 70 at a measured distance or preventing the slider from moving off the side rails 40.

Figure 10:
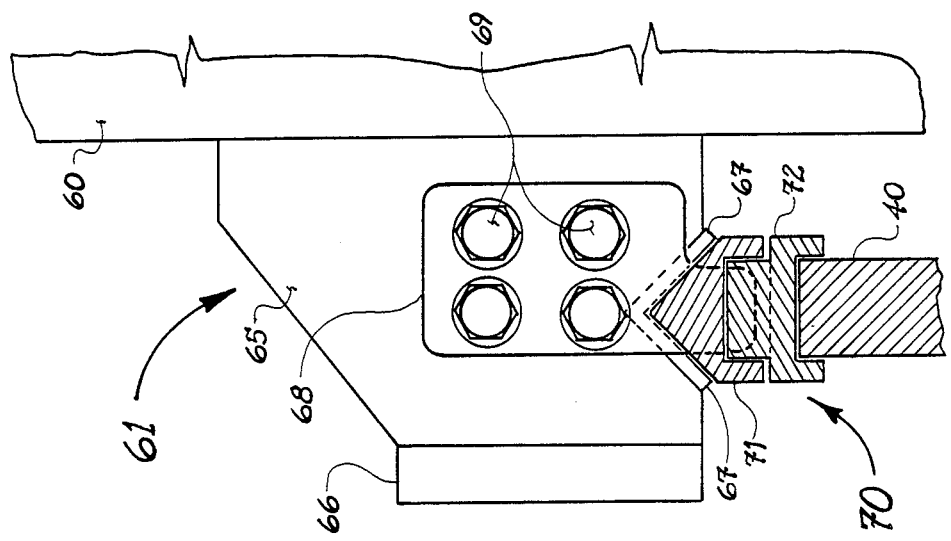
FIG. 10 is a view taken along line 10—10 of FIG. 9.
Figure 9:
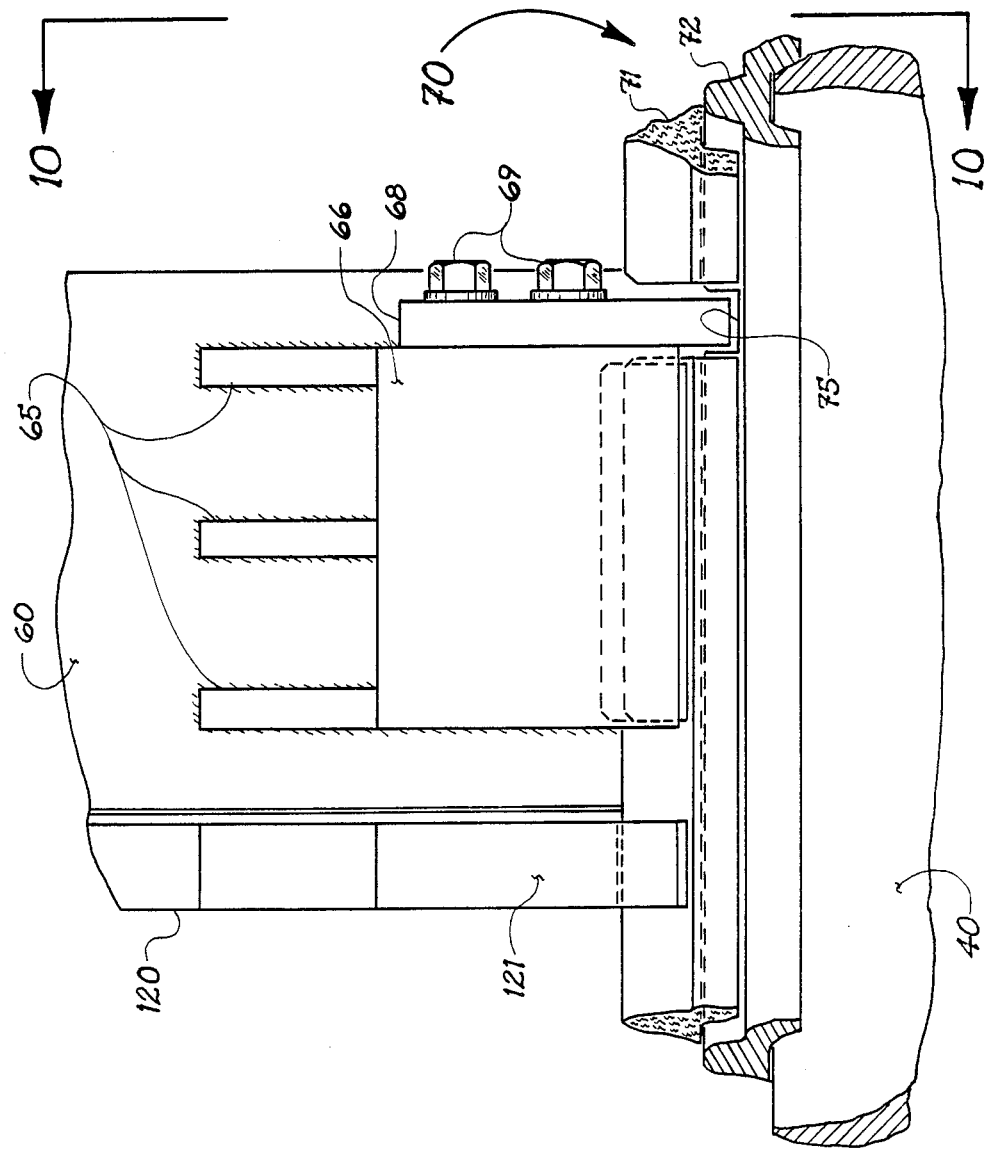
FIG. 9 is a side view of another embodiment of a means for attaching the slider member to the mobile platen of FIG. 1.
Figure 13:
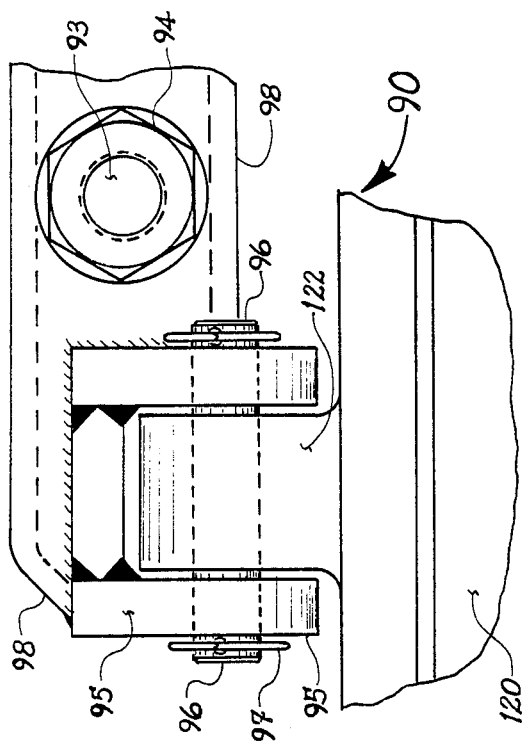
FIG. 13 is a view taken along line 13—13 of FIG. 11.
Figure 14:
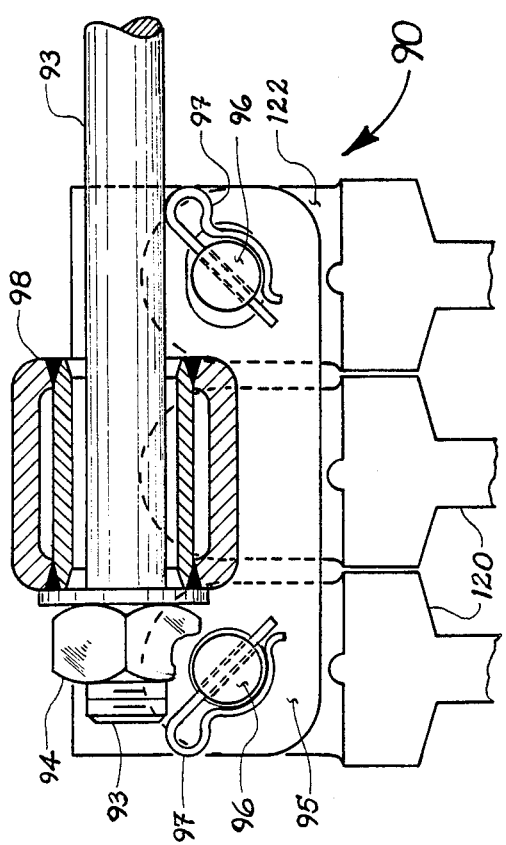
FIG. 14 is a view taken along line 14—14 of FIG. 12.

Another embodiment for connecting the slider member 70 to the mobile platen 60 is shown in FIGS. 9 and 10. In this embodiment, the hanger 61 is comprised of any number of reinforcing plates or brackets 65 attached to the mobile platen 60 such as by welding. A side plate 66 reinforces the brackets 65. Plates 67 in the form of a V-shape channel are attached to the underside of the brackets 65. A fastening means for connecting the hanger 61 to the slider members 70 consists of an index plate 68 and removable threaded bolts 69. The index plate 68 can be indexed into notches 75. The plate 68 and notches 75 serve the dual purpose of moving the slider member 70 with the movement of platen 60 and predetermining the length of movement of the slider base plate 72.

To carry out the shifting of the flat plate-type structures 120 within the squeezer a means for fixing the position of any number of flat plate-type structures is required. For example, a first clamping means 90 is used to clamp at least one structure to a stationary member (not shown) separate and independent from the squeezer apparatus or to a stationary portion of the squeezer apparatus. Then any number of the remaining structures, not clamped by the first clamping means, can be clamped together.

In FIGS. 1, 2 and 3, a plurality of flat plate-type structures 120 are shown fixed to the stationary platen 20 by a first clamping means 90 described herein below and shown in more detail in FIGS. 11-14. In another embodiment, the structures can be clamped, using the first clamping means 90, to the side rails 40 (not shown). The remaining flat plate-type structures not clamped by the first clamping means 90, can be clamped together or clamped to the mobile platen 60 by a second clamping mean 100 shown in FIG. 15 described hereinafter. Preferably, the remaining structures are clamped, together, by clamping means 100 such that when the mobile platen 60 is retracted, the structures move as one unit with the slider member 70 due to the weight of the flat plate-type structures resting on the slider member and frictional forces. Once the structures clamped by the second clamping means 100 have been shifted and split apart from the structures clamped by the first clamping means 90 to a desired gap, the desired flat plate-type structure or its internal parts can be removed and inspected. After the internal parts or structure are removed and/or replaced, the flat plate-type structures are recompressed by actuating the hydraulic cylinders 40 and moving the mobile platen 60 against and structures.

As the flat plate-type structures 120 are pressed together with the hydraulic cylinders, the structures ride on top of the slider member 70 until initial contact between structures at the separation joint is achieved. Then, fastening means 63 is removed from platen 60. Thereafter, the hydraulic cylinders 50 are again actuated to compress the flat plate-type structures to a determined gasket pressure. During this final movement, structure hangers 121 slide axially and on top of the slider members 70, and do not ride statically on top of the slider member 70. The interface between the slider member 70 and the inner surface 123 of structures support hangers 121 must possess a low friction factor.

With reference to FIGS. 11-15, there is shown one embodiment of the first clamping means 90 for holding a single or plurality of flat plate-type structures in place during the shifting operation which the squeezer apparatus. A single or plurality of flat plate-type structures 120 can be fixed in position and clamped to the platen 20 by the first clamping means 90. The clamping means 90 comprises a support plate 91 mounted on the stationary platen 20 with bolts 92, a tie-rod 93 with threaded ends, nuts 94, and "U-shaped" support plates 95 removably mounted on structures 120 through the lugs 122 with pin members 96. Smaller pin members 97 can be used to prevent the pin members 96 from slipping away from the lugs 122. A reinforcing channel member 98 can be attached to the support plates 95 as shown. Any number of clamping means 90 can be used, preferably, on top and bottom of the flat plate-type structures and platen 20 as shown in FIG. 3. The proper placement and torquing of the restraint members or clamping means 90 is necessary to prevent liquid leakage from the flat plate structures and structure-to-structure movement.

Figure 15:
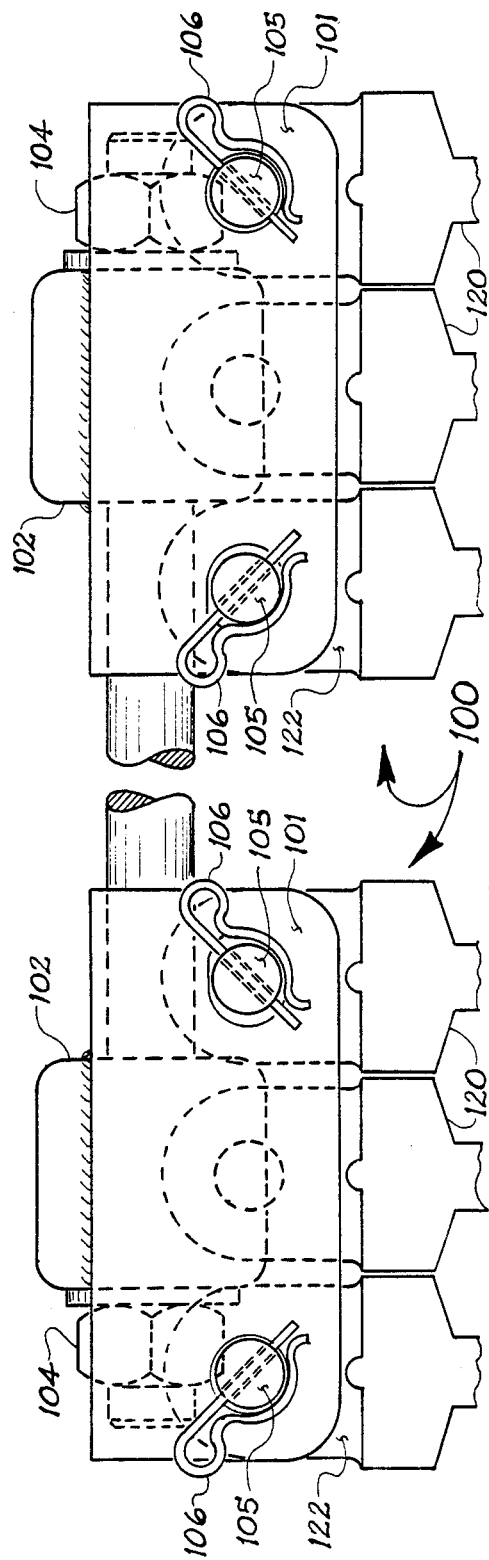
FIG. 15 is a side view of a means for clamping together a plurality of electrolytic flat plate-type cell frame structures in the squeezer apparatus of FIG. 1.

The second clamping means 100 is used for holding a single or plurality of plate-type structures 120 together during the shifting operation without attaching the structures to any fixed object. In one embodiment, clamping means 100 is removably attached to the mobile platen 60 and used for clamping together a single or plurality of flat plate-type structures to the platen 60. In another and preferred embodiment, the clamping means 100 is used for clamping together one or more flat plate-type structures together excluding the mobile platen 60. As shown in FIG. 15, the clamping means 100 comprises "U-shaped" support plates 101 removably mounted on cell frame structures 120 through the lugs 122 with pin members 105 and small pin members 106. A tie-rod 103 with threaded ends and nuts 104 is removably attached to the reinforcing channel member 102 which in turn is attached to support plate 101. Any number of structures can be tied together by using one or more clamping means removably mounted on one or more flat plate-type structures. Preferably, the clamping means 100 are used on top and bottom of the structures as shown in FIG. 3.

The apparatus of the present invention is useful for compressing and shifting a single or plurality of flat plate-type structures 120 supported on side rails 40. The flat plate-type structures 120 can be, for example, of the filter-press type used in a wide variety of processes, for example, in filtering processes such as for liquid-solid separations, in molding processes, and in chlor-alkali processes. The structures may be made of metals such as nickel, titanium, ductile iron, steel, and the like or the structures can be made from plastic materials such as polypropylene, Teflon ®, and the like. The flat plate-type structures of the present invention will be described herein with reference to flat plate-type cell frame structures used in a chlor-alkali process for the production of chlorine and an alkali metal hydroxide such as sodium hydroxide by electrolysis, but it is understood that the invention is not intended to be limited thereto.

The flat plate-type cell frame structures used in the chlor-alkali industry are well known and described fully in the prior art such as in U.S. Pat. Nos. 4,488,946 and 4,111,779. Preferably, the type of cell frame structures used in the present invention are of the type described in U.S. Pat. No. 4,488,946, incorporated herein by reference. The cell frame structures may be monopolar or bipolar. The cell frame structures are of the flat plate-type or filter-press type and are compressed together with a separator and gasket member interposed between two cell frame structures to form an "electrolyzer", as described generally herein below.

Again, with reference to FIGS. 1, 2 and 3, a filter press-type electrolyzer is shown within the squeezer apparatus. The "filter press-type electrolyzer" is used, for example, in a chlor-alkali process for the production of chlorine and an alkali metal hydroxide such as sodium hydroxide. The electrolyzer comprises a number of flat plate-type cell frame structures 120, separators 130 and gasket members 140 compressed together by a compressive apparatus such as a hydraulic squeezer or filter press. Supporting hangers or arms 121 are attached to the flat plate-type cell frame structure 120 in order to hang the frame structure on the side rails 40 of the squeezer apparatus. During closure of the mobile platen 60, i.e., when the platen is pressed against the cell frame structures 120 by the hydraulic cylinders 50, the hydraulic press slowly exerts force against the first cell frame structure via the mobile platen 60 contacting the structure and this force is transmitted from cell frame structure to cell frame structure to initiate movement in all the structures and to close-up any number of cell frame structures as a series to make up the electrolyzer, thus allowing liquid filling and then operation as a chlor-alkali electrolysis cell electrolyzer. The electrolyzer may be of the bipolar or monopolar cell frame type. Anywhere from two to as many as several hundred flat plate-type cell frame structures can be used to make up the electrolyzer. The flat plate-type cell frame structures 120 can be any shape or size desired with respect to its intended use.

To illustrate the present invention further and not to be limited thereby, the flat plate-type cell frame structures 120 of the bipolar type may further comprise an anode and cathode compartment separated by a partition wall made for example of ductile iron or cast steel. The anode compartment interior may be covered by a liner material, for example, by titanium and the cathode compartment interior may be covered, for example, by nickel.

An anode electrode 150 and a cathode electrode 160 may be welded onto a array of bosses (not shown) of each lined compartment. Each compartment have inlet nozzle (not shown) for receiving electrolyte at its bottom and an outlet nozzle (not shown) for discharging electrolyte and gas at its top.

The separator 130 used in the above electrolyzer may be a diaphragm-type or ion exchange membrane-type. Ion exchange membrane materials commonly used, for example, include those marketed by E. I. duPont de Nemours & Company under the trademark Nafion ® and by Asahi Glass Company Ltd. under the trademark Flemion ®. The membranes are available principally in sheet-like form. The membrane is used for separating the cell frame structures into the anode and cathode electrode compartments containing electrolyte. For example, a membrane-type cell used for the production of a halogen and an alkali metal hydroxide may use an ion exchange membrane to separate the anode compartment containing anolyte and an anode electrode member 150 from the cathode compartment containing catholyte and a cathode electrode member 160. The gasket members 140 are used in the electrolyzer for providing a fluid-tight, i.e. liquid and gas-tight seal between the membrane and the cell frame structure.

The electrolyzer may comprise any number of cell frame structures, wherein each structure comprises an anode and a cathode compartment facing each other and an ion exchange membrane between the anode and cathode compartment. The production capacity of one electrolyzer can be adjusted by increasing or decreasing the number of flat plate-type cell frame structures to be mounted in the electrolyzer.

For operation of the electrolyzer, a series of flat plate-type electrolytic cell frame structures 120, ion-exchange membranes 130 and gasket members 140 between each frame structure are positioned on side rails 40 of the squeezer apparatus and compressed together. During operation of the electrolyzer, it may be desirable and in some instances it may be necessary to remove or replace one cell frame structure, separator or gasket member. For example, if one cell frame structure within the electrolyzer develops a problem, particularly if the ion-exchange membrane between two cell frame structures is damaged or faulty, the present invention allows access to the faulty cell structure and membrane with little or no disturbance to the other cell frame structures, membranes or cell-to-cell gasketing. Using the present invention an operator can advantageously remove or replace, for example, a cell frame structure by shifting the structure, efficiently and quickly, away from the other structures within the squeezer without disturbing the other non-problem cell frame structures, separators or gasket members and thus, decreases any delay in operation.

By clamping together the desired cell frame structures using the clamping means 90 and 100 and then retracting the mobile platen 60 which in turn moves the slider member 70, one or more flat plate-type cell frame structures or cell units can be relocated or shifted at one time as a unit or body of cell units in order to get at the faulty membrane or cell frame structure. This method of shifting cell structures, in turn, decreases waste of the relative expensive ion-exchange membranes since only the faulty membrane is disturbed, decreases shutdown time since only one separation of the cell structures is required to remove a faulty cell or membrane, and decreases cost and time in re-gasketing cell-to-cell structure joints. It is, therefore, an important advantage of the present invention to be able to selectively shift any number of cell frame structures on the pressing apparatus and avoid disturbance to non-problem cell frame structures and separators.

What is claimed is:

1. In an apparatus for pressing plate-type structures together comprising a first and second support means adapted for supporting a pair of side rails, the side rails spaced apart and generally perpendicular to the support means, the side rails adapted for supporting plate-type structures with hanger members attached thereto and slidably mounted on the side rails, a mobile platen with hanger members attached thereto and slidably mounted on the side rails, said mobile platen connected to a press means, said press means adapted for pressing the mobile platen against and toward the plate-type structures such that the plate-type structures are compressed together, said press means adapted for retracting the mobile platen from the plate-type structures, the improvement which comprises:

an elongated slider member disposed beneath all of the hanger members of the plate-type structures, slidably mounted on the side rails and releasably fastened to the mobile platen such that at least one or more plate-type structures can be shifted along the axis of the side rails when the mobile platen is moved.

2. The apparatus of claim 1 wherein the first support means is a stationary platen.

3. The apparatus of claim 2 wherein the improvement includes at least one first clamping means for releasably clamping at least one plate-type structure to a stationary support means.

4. The apparatus of claim 3 wherein the first clamping means is releasably fastened to the first stationary platen.

5. The apparatus of claim 3 wherein the first clamping means is releasably fastened to the side rails.

6. The apparatus of claim 3 wherein the improvement includes
   at least one second clamping means for releasably clamping at least one or more plate-type structures to each other.

7. The apparatus of claim 3 wherein the improvement includes
   at least one second clamping means for releasably clamping at least one or more plate-type structures to the mobile platen.

8. The apparatus of claim 1 wherein the plate-type structure is an electrolytic cell frame member useful in electrolysis processes.

9. The apparatus of claim 8 wherein the plate-type structures are chlor-alkali electrolytic cell frame structures.

* * * * *